United States Patent
Verdier

[15] 3,675,700
[45] July 11, 1972

[54] SNOW TIRE

[72] Inventor: Henri Verdier, Beauregard-L'Eveque, France

[73] Assignee: Compagnie Generale Des Etablissements Michelin raison sociale Michelin & Cie, Clermont-Ferrand (Puy-de-Dome, France

[22] Filed: July 23, 1970

[21] Appl. No.: 57,594

[30] Foreign Application Priority Data

July 28, 1969 France..................................6925816
June 1, 1970 France..................................7020094

[52] U.S. Cl..............................................152/209, 152/210
[51] Int. Cl..........................................................B60c 11/16
[58] Field of Search.......................................152/209 C, 210

[56] References Cited

UNITED STATES PATENTS 3,566,948   3/1971   Menell...................................152/210
3,559,711   2/1971   Schelkmann.........................152/210

Primary Examiner—James B. Marbert
Attorney—Brumbaugh, Graves, Donohue & Raymond

[57] ABSTRACT

The tread of a snow tire is formed with a plurality of spaced-apart blocks in relief succeeding one another in the longitudinal direction and additional elements in relief connecting the spaced-apart blocks.

5 Claims, 7 Drawing Figures 3,675,700

SNOW TIRE

BACKGROUND OF THE INVENTION

This invention relates to pneumatic tires and more particularly to novel and highly effective pneumatic tires intended to travel on roads that are covered with snow or ice.

It is conventional to provide winter tires intended to travel on snow and ice with a tread formed in such a manner as to have in relief blocks that are isolated on all sides from each other by grooves or recesses. These blocks of various shapes are imbricated with respect to one another both in the circumferential direction and in the transverse direction. They are in a sense analogous to the teeth of a gear and are intended to impress themselves into the snow in order to compact it and to have good traction on it. Furthermore, certain blocks, particularly those located in the side portions of the tread, may bear studs housed in recesses specially adapted to receive them in order to reduce skidding on ice.

This type of tire, although universally employed, nevertheless has a serious drawback, namely inadequate adherence upon strong starting or braking torques, as occurs when starting up on a hill or rapidly decelerating. This inadequacy is due to the fact that the different isolated blocks have a tendency to bend over or to retract when the tire is subjected to a high torque.

SUMMARY OF THE INVENTION

An object of the present invention is to remedy the drawback of conventional snow tires noted above and more particularly to provide a snow tire having excellent adherence when subjected to high starting or braking torque.

The pneumatic tire in accordance with the invention whose tread is formed so as to have blocks in relief that follow one another or are imbricated one with respect to another is characterized in that the blocks are connected to each other in the circumferential direction by elements or ribs which are also in relief. Thus, instead of the blocks being isolated from each other like islands, they are connected to each other by isthmuses in the circumferential direction. The ribs connecting the blocks are sufficient to provide each block with a support which prevents it from bending over or retracting in response to tangential forces. The mutual support thus imparted to the rubber blocks that follow each other in the circumferential direction then makes it possible to increase the depth of the grooves surrounding these blocks, which is favorable for adherence, without this resulting in the retraction or inclining of the blocks in contact with the ground.

The formation of solid blocks connected by relatively narrow ribs can be easily obtained, for instance by means of continuous or intermittent circumferential grooves, which may be identical or different, succeeding each other in the transverse direction and the path of which is suitably selected so that the spacing between two grooves varies and is now slight and now large.

It may be advantageous to divide the tread into three parts of substantially equal width by means of two wide circumferential grooves intended to facilitate the discharge of water when traveling over melting snow and to obtain on both sides of these wide grooves, by means of narrow circumferential grooves of different shapes supplemented by transverse cuts, a succession of blocks connected circumferentially to each other.

The tread may also be divided into three protruding ribs which are continuous in the circumferential direction by means of two wide circumferential grooves, these ribs being formed of successive blocks in part resting against each other and in part separated from each other by transverse grooves.

In case the tread is divided into three parts by means of two wide circumferential grooves, it is frequently advantageous to adopt the same configuration in the central part and in the inner portions of the two lateral parts, the blocks being larger and more widely spaced apart in the outer portions of the two side parts.

BRIEF DESCRIPTION OF THE DRAWING

An understanding of additional aspects of the invention can be gained from a consideration of the following detailed description of several representative embodiments thereof, in conjunction with the appended figures of the drawing, wherein.

DESCRIPTION OF THE PREFERRED EMBODIMENTS

Figure 1:
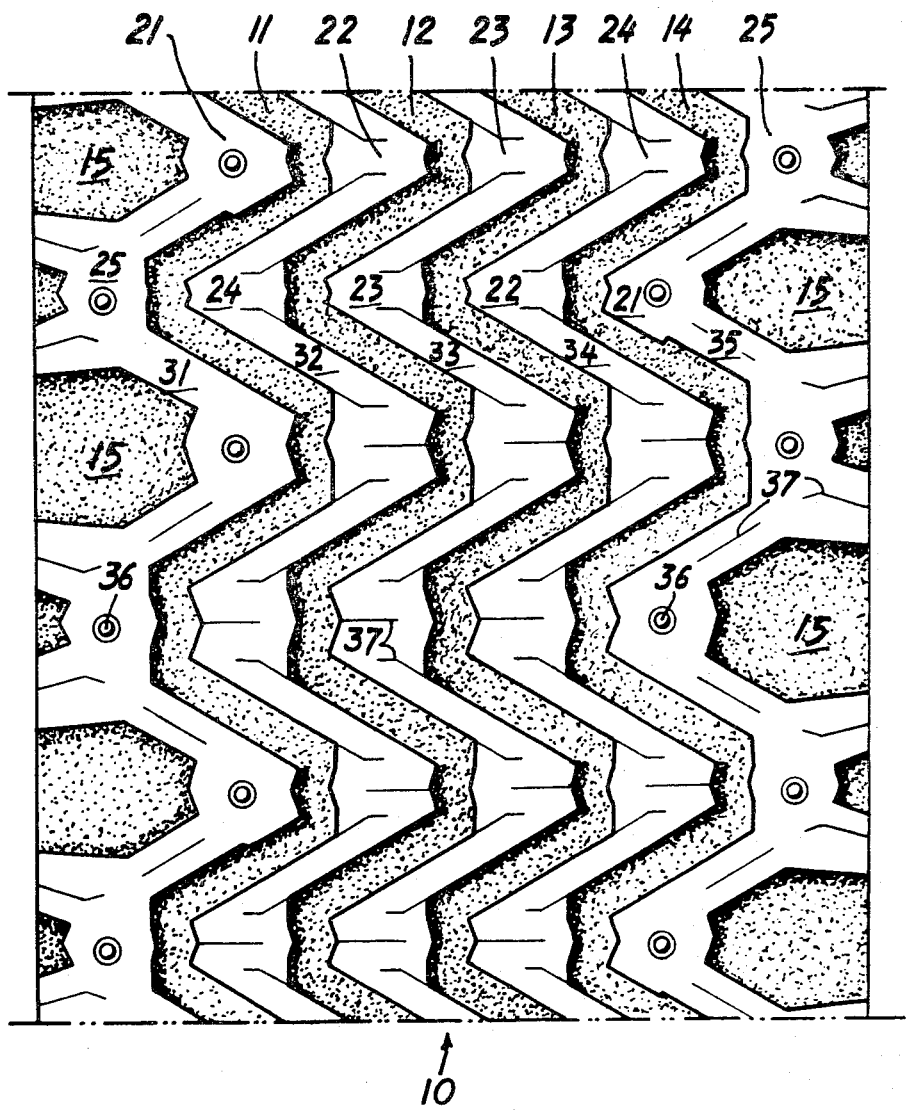
FIGS. 1–7, respectively, show, each in developed plan view, portions of seven different embodiments of a tread in accordance with the invention. In each figure, there is shown a section of tread corresponding to about 30°. The recessed portions are shown speckled.
Figure 2:
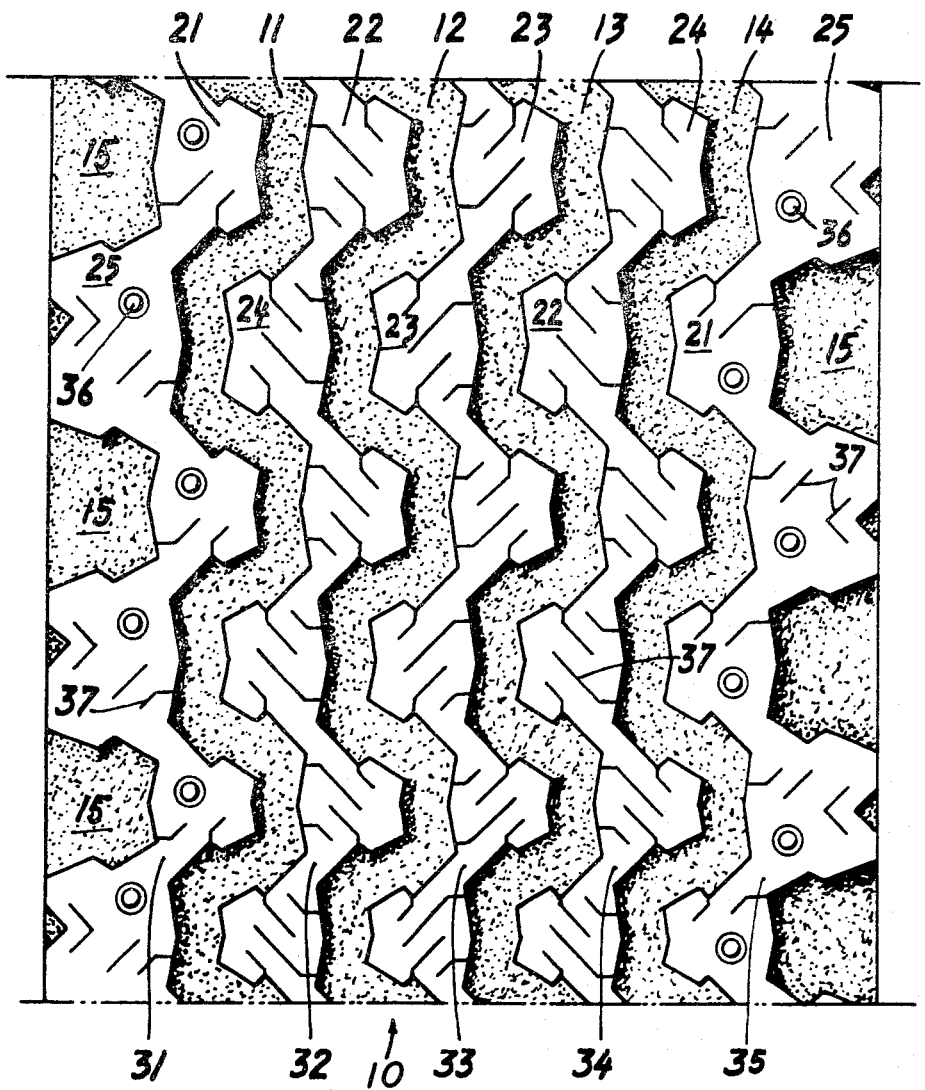

In FIGS. 1 and 2, the tread 10 has four identical circumferential grooves such as 11, 12, 13 and 14 as well as transverse recesses such as 15, provided in each of the edges of the tread. These grooves and recesses define blocks in relief such as 21–25 which follow one another in the transverse direction. In the circumferential direction these blocks are connected by narrow ribs such as 31–35 which are relatively inclined and elongated in the case of FIG. 1 and short and longitudinal in the case of FIG. 2. Some of the blocks 23, for example, are in the same longitudinal row as some of the blocks 22 and alternate therewith. The blocks 21–25 of the lateral rows bear anti-skid studs 36. The different blocks bear fine cuts such as 37 which increase the mobility of the blocks without destroying the solidness thereof.

In the case of the treads a portion of which is shown in FIGS. 1 and 2, the entire surface of the parts of the tread which can enter into contact with the ground (non-speckled portions) represents, measured in the drawings, about 56 percent of the total surface of the tread.

Figure 3:
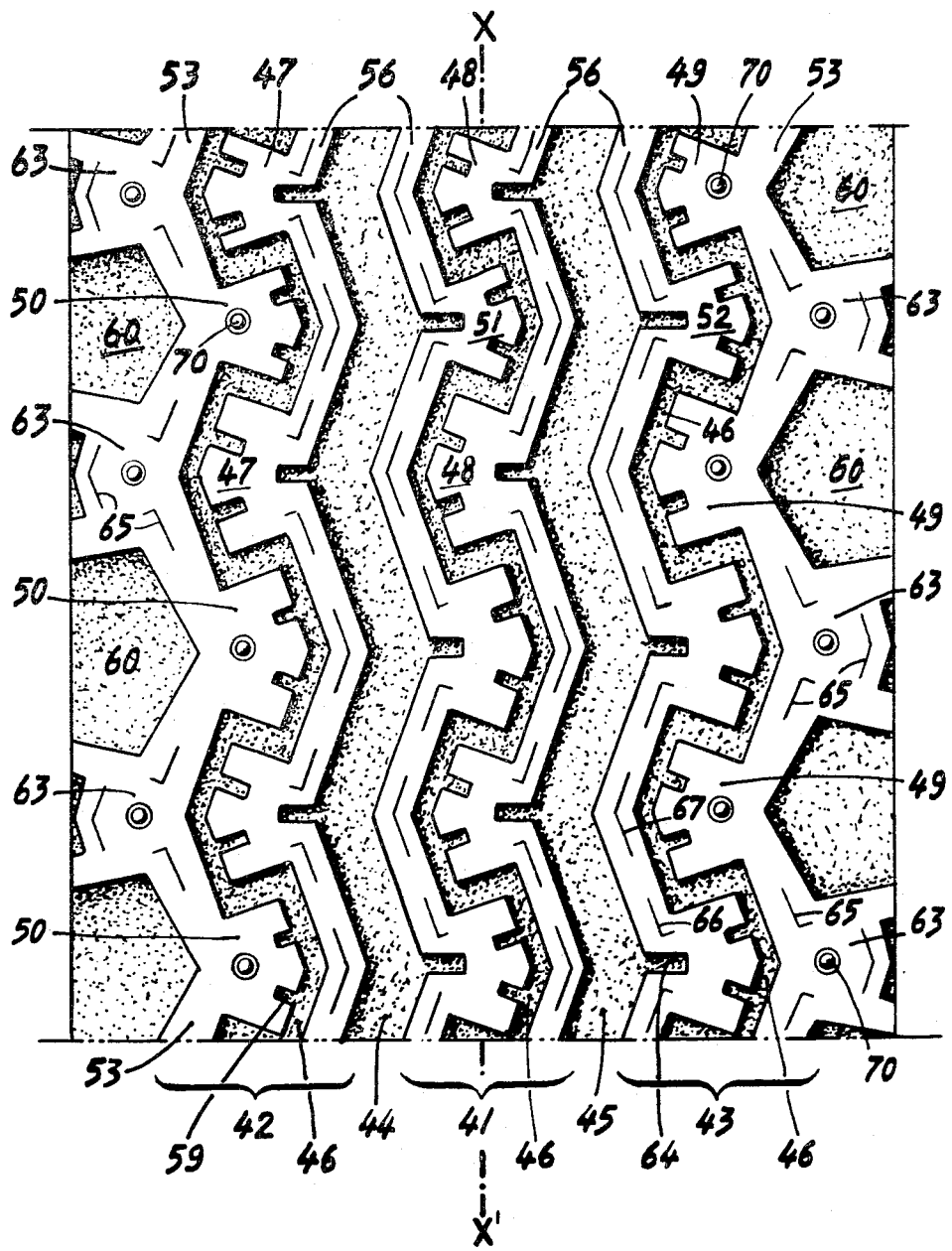
Figure 4:
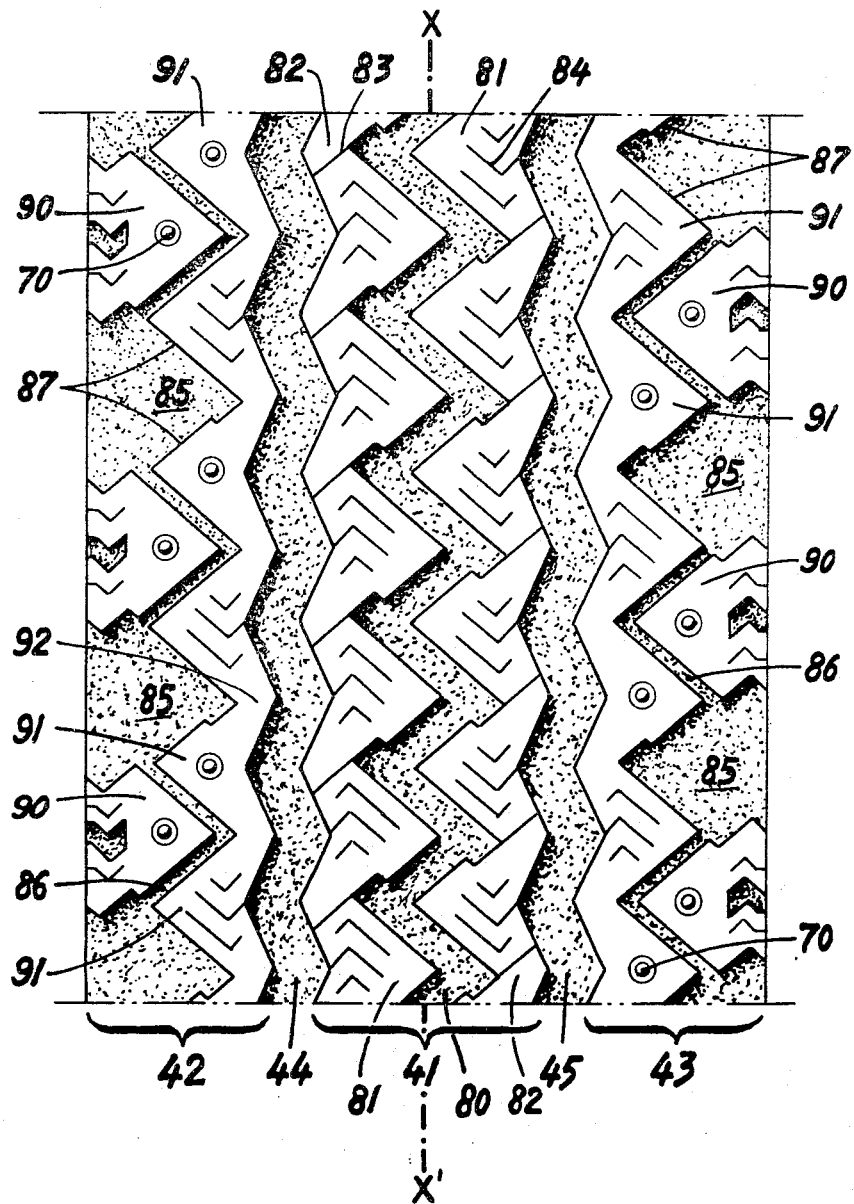

In the case of FIGS. 3 and 4, instead of using circumferential grooves which are all identical to each other as in the case of FIGS. 1 and 2, there are employed grooves of several different types. As can be seen in these figures, the central circumferential portion 41 is separated in these two embodiments from the edge portions 42 and 43, which are substantially of the same width as the part 41, by two wide circumferential channels or grooves such as 44 and 45 intended to facilitate the removal of water on melting snow. The walls of these drainage channels form angles of less than 45° with respect to the longitudinal direction X–X' of the tread.

In the sculpturing shown in FIG. 3, each of these longitudinal portions 41–43 is traversed by a trough or groove such as 46 which is continuous but narrower and the walls of which are alternately parallel and perpendicular to the walls of the channels 44 and 45 so as to cut out blocks such as 47–49 on the one hand and 50–52 on the other hand. These blocks are transversely imbricated. Namely, some (47–49) cooperate with thin longitudinal bearing ribs such as 56 and others (50–52) cooperate with thicker bearing ribs such as 53. On each edge of the tread, the circumferential portions 42 and 43 are provided with wide recesses such as 60 that are open towards the outside. The ribs 53 include protrusions in the form of transverse bearing blocks such as 63, some of which alternate with the blocks 50 and others with the blocks 49. Oblique cuts such as 59 connected to the troughs 46 and transverse cuts such as 64 connected to the channels 45 serve to increase the mobility of the blocks 47–49 and 50–52. Cuts such as 65 serve to increase the mobility of the transverse bearing blocks 63 in the same way as cuts such as 66 and 67 serve to increase the mobility of the bearing ribs 56. The marginal blocks 63 and the blocks 49 and 50 have recesses to receive anti-skid studs 70.

In the sculpturing shown in FIG. 4, the central circumferential part 41 is traversed by a groove such as 80 of a width of approximately half that of the drainage channels 44 and 45 so as to constitute two rows of blocks such as 81 which are imbricated in each other. The blocks 81 are separated circumferentially from each other by constrictions such as 82 which act as connecting ribs permitting the longitudinal bearing of the blocks. Incisions such as 83 render the rubber flexible in the vicinity of the constrictions 82, in the same way as the blocks 81 are made slightly mobile by incisions such as 84.

The two lateral parts 42 and 43 shown in FIG. 4 have wide substantially triangular recesses such as 85 which are open towards the outside of the tread and connected together by narrow channels such as 86. The inner edges 87 of the recesses 85 as well as the walls of the channels 86 form a circumferential broken line and are not parallel to the walls of the channels 44 and 45 so as to define on the one hand marginal blocks such as 90 and blocks such as 91 connected circumferentially by longitudinal bearing constrictions such as 92. The marginal blocks 90 and one block 91 out of two have recesses to receive anti-skid studs 70.

In the case of the treads a portion of which is shown in FIGS. 3 and 4, the entire surface of the parts of the tread which are capable of entering into contact with the ground (parts shown without speckling) represents, as measured on the drawings, about 58 percent of the total surface of the tread.

Figure 5:
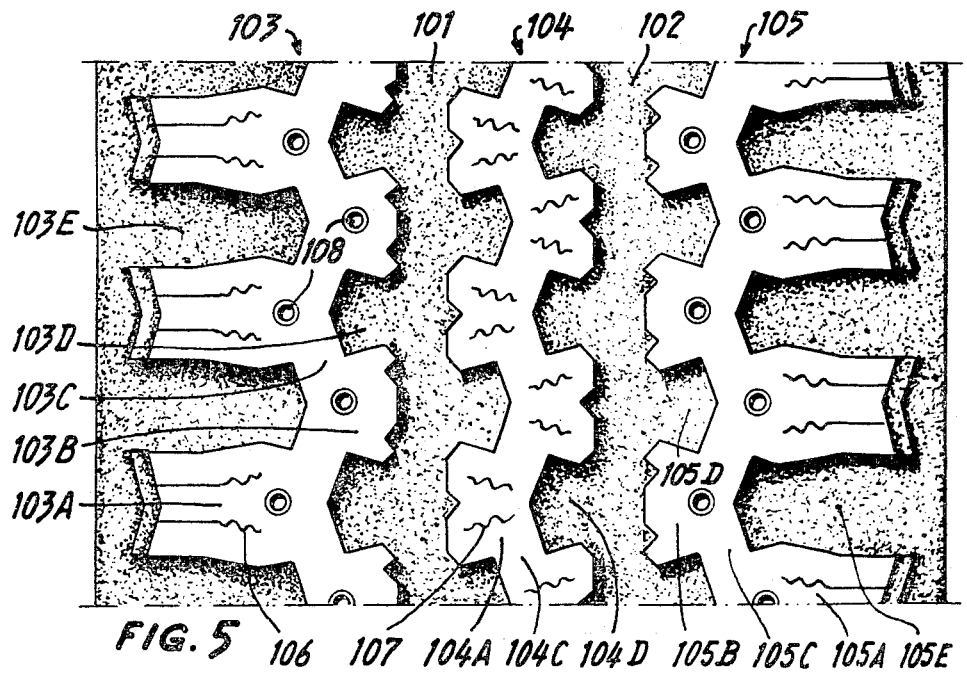

The tread a portion of which is shown in FIG. 5 is formed with two wide circumferential grooves 101 and 102 and three ribs 103, 104 and 105 which are continuous in the circumferential direction.

The rib 103 comprises outer blocks 103A and inner blocks 103B which are connected together by ribs 103C. The outer blocks 103A are partly separated from each other by transverse grooves 103E and the inner blocks 103B by transverse grooves 103D.

The same arrangement is found again with respect to the rib 105 composed of outer blocks 105A and inner blocks 105B connected by ribs 105C and separated in part by transverse grooves 105D and 105E.

In the two side ribs 103 and 105 the outer blocks 103A and 105A are more massive than the inner blocks 103B and 105B, respectively, and are spaced apart farther from each other than the interior blocks are from each other.

The central rib 104 also comprises blocks 104A connected by ribs 104C and separated by transverse grooves 104D. These blocks have a shape which, as a whole, is similar to that of the inner blocks 103B and 105B of the ribs 103 and 105, respectively.

Fine slits or incisions such as 106 and 107 may be provided in the different blocks forming the ribs 103, 104 and 105 in order to increase the adherence to wet roads. Furthermore, in order to secure anti-skid studs in the tread, certain blocks, preferably those of the side ribs 103 and 105, may have recesses such as 108 intended to receive these studs.

Figure 6:
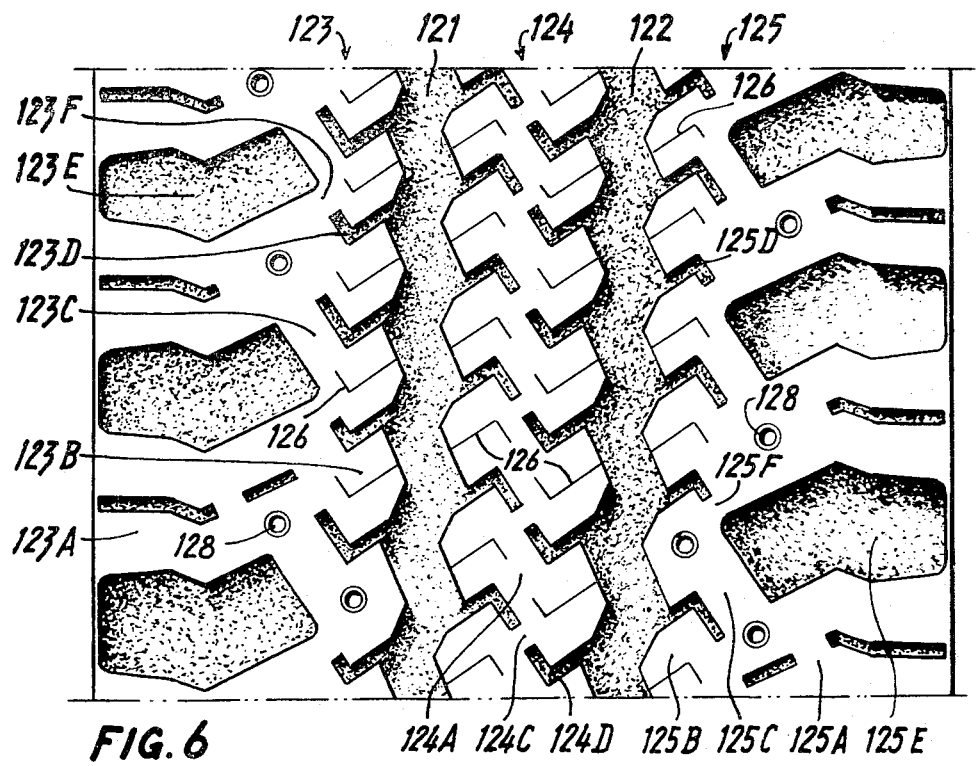

The tread of which a portion is shown in FIG. 6 is cut by two wide circumferential grooves 121 and 122 into three ribs 123, 124 and 125 which are continuous in the circumferential direction.

The rib 123 comprises outer blocks 123A and inner blocks 123B connected together by ribs 123C and 123F. The outer blocks 123A are separated from each other by transverse recesses 123E, and the inner blocks 123B by channels 123D of generally transverse orientation.

A similar arrangement is present in the rib 125 comprising outer blocks 125A and inner blocks 125B connected by ribs 125C, 125F and separated by transverse recesses 125E and channels 125D of generally transverse orientation.

The central rib 124 comprises blocks 124A connected by ribs 124C and separated by channels 124D of generally transverse orientation. These blocks 124A have an overall shape similar to that of the inner blocks 123B and 125B of the ribs 123 and 125, respectively.

Fine slits or incisions such as 126 may be provided in the blocks forming ribs 123, 124 and 125. Furthermore, in order to fasten anti-skid studs in the tread, some of the blocks, preferably those of the side ribs 123 and 125, may have recesses such as 128 intended to receive such studs.

Figure 7:
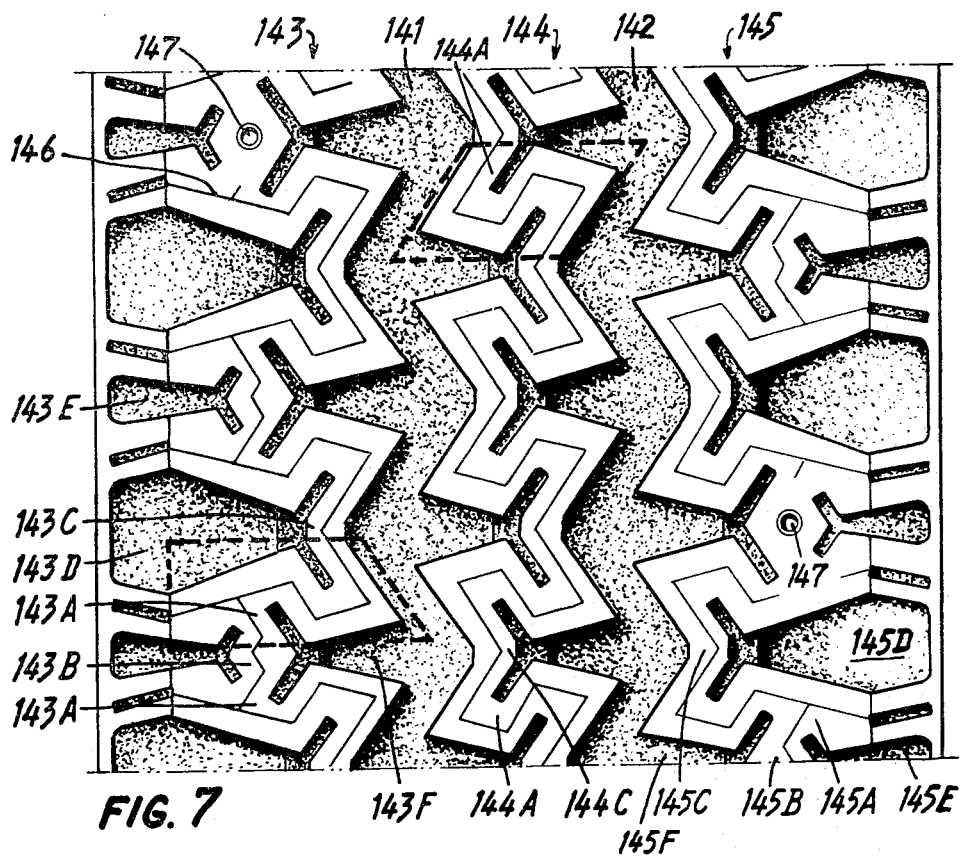

The portion of the tread shown in FIG. 7 is also subdivided by two wide circumferential grooves 141 and 142 into three ribs 143, 144 and 145 which are continuous in the circumferential direction.

The rib 143 comprises blocks 143A, one of which is shown, for greater clarity, surrounded by a trapezoid in broken outline. These blocks are connected together by a short rib 143B on the one hand and 143C on the other hand. They are partly separated from each other by transverse recesses 143D, 143E and 143F.

The same arrangement is present again in connection with the rib 145 which comprises blocks 145A connected by ribs 145B and 145C and separated in part by recesses 145D, 145E and 145F.

The central rib 144 comprises blocks 144A, one of which is shown, for greater clarity, surrounded by a parallelogram. These blocks are connected together by a short rib 144C and have a shape which, as a whole, is similar to that of the portion of the blocks 143A and 145A which is adjacent the groove 141 or 142.

Fine slits or incisions such as 146 may be provided in the blocks 143A, 144A and 145A. As in the preceding embodiments, holes such as 147 may be provided, preferably in the side ribs 143 and 145, to receive anti-skid studs.

Thus there is provided in accordance with the invention a snow tire that offers traction superior to the traction of which conventional snow tires are capable, particularly under high torque during acceleration or braking. Many modifications of the representative embodiments of the invention disclosed herein will readily occur to those skilled in the art upon a reading of the present specification. Accordingly, the invention is to be construed as including all the embodiments thereof within the scope of the appended claims.

I claim:

1. A snow tire comprising a tread, the tread being formed with a plurality of circumferentially continuous elements in relief and a plurality of circumferentially continuous grooves bounding and separating said elements in relief, each of said continuous elements in relief comprising wide island blocks connected by narrow isthmus blocks longitudinally adjacent thereto and each of said grooves having in main outline a substantially uniform width and being configured to form blocks alternately of the island and isthmus sort, so that deformation of said elements in relief is reduced and better traction is provided during rapid acceleration or deceleration.

2. A snow tire according to claim 1 wherein an adjacent two of said circumferentially continuous grooves are alternately near to and remote from each other and, when near to each other, define an isthmus block therebetween and, when remote from each other, define an island block therebetween.

3. A snow tire according to claim 1 wherein said circumferentially continuous grooves comprise two wide grooves dividing the tread into a central portion and two lateral portions, the block structures on both sides of said wide grooves being similar.

4. A snow tire according to claim 1 wherein said circumferentially continuous grooves comprise two wide grooves dividing the tread into a central portion and two lateral portions, further comprising a plurality of transverse grooves connected to said wide grooves and indenting said circumferentially continuous elements in relief.

5. A snow tire according to claim 1 wherein the total area of the parts of the tread adapted to contact the ground is less than 60 percent of the total area of the tread.

* * * * *